(12) United States Patent
Rosine et al.

(10) Patent No.: US 7,581,771 B2
(45) Date of Patent: Sep. 1, 2009

(54) SHOCK ABSORBING SHOVEL ASSEMBLY

(75) Inventors: Lyle A. Rosine, Oswego, IL (US); Torrence Anderson, Batavia, IL (US)

(73) Assignee: Suncast Corporation, Batavia, IL (US)

( * ) Notice: Subject to any disclaimer, the term of this patent is extended or adjusted under 35 U.S.C. 154(b) by 407 days.

(21) Appl. No.: 11/443,534

(22) Filed: May 31, 2006

(65) Prior Publication Data

US 2007/0126250 A1 Jun. 7, 2007

Related U.S. Application Data

(63) Continuation-in-part of application No. 11/293,068, filed on Dec. 2, 2005, now Pat. No. 7,118,145.

(51) Int. Cl.
*A01B 1/02* (2006.01)
*E01H 5/02* (2006.01)

(52) U.S. Cl. .......................... 294/54.5; 294/56; 294/57

(58) Field of Classification Search .................... 294/49, 294/54.5, 56, 57, 59
See application file for complete search history.

(56) References Cited

U.S. PATENT DOCUMENTS

| 483,477 A | 9/1892 | Ryan |
| 1,181,135 A * | 5/1916 | Harrison ...................... 294/56 |
| 2,996,111 A | 8/1961 | Mocerino et al. |
| 3,322,211 A | 5/1967 | Alabuzhev et al. |
| 3,897,078 A | 7/1975 | Melnick et al. |
| 4,538,847 A | 9/1985 | Lapshansky |
| 4,691,954 A | 9/1987 | Shaud |
| 4,730,860 A | 3/1988 | Padgett |
| 5,516,101 A | 5/1996 | Peng |
| 5,533,768 A | 7/1996 | Mitchell |
| 5,727,829 A | 3/1998 | Bellichak |
| 5,816,634 A | 10/1998 | Jacobs et al. |
| 5,845,949 A * | 12/1998 | Vosbikian .................. 294/54.5 |
| 6,145,899 A | 11/2000 | Kelemen |
| 6,792,829 B2 | 9/2004 | Garcia et al. |
| 7,118,145 B1 * | 10/2006 | Rosine et al. .................. 294/57 |
| 2003/0025344 A1 * | 2/2003 | Schultice et al. ........... 294/54.5 |

FOREIGN PATENT DOCUMENTS

| WO | WO 97 39858 A1 | 10/1997 |
| WO | WO 99 52685 A1 | 10/1999 |

* cited by examiner

*Primary Examiner*—Dean J Kramer
(74) *Attorney, Agent, or Firm*—McHale & Slavin, P.A.

(57) ABSTRACT

The present invention provides a lightweight shovel with a large scoop type blade, a plastic coated metal handle and a compact shock absorbing cartridge located between the distal end of the metal handle and a D-shaped handgrip so as to not interfere with the operation of the shovel.

19 Claims, 7 Drawing Sheets

SHOCK ABSORBING SHOVEL ASSEMBLY

RELATED APPLICATIONS

This application is a Continuation In Part of U.S. application Ser. No. 11/293,068 filed Dec. 2, 2005 now U.S. Pat. No. 7,118,145 entitled Shock Absorbing Shovel Handle, the contents of which are incorporated herein in their entirety.

FIELD OF THE INVENTION

This invention relates generally to manual tool handles, and more specifically, to a shock absorbing shovel assembly useful for moving and scraping debris and the like.

BACKGROUND INFORMATION

The shovel may be one of the oldest known hand tools. The basic components of the shovel include an elongated handle and a blade. The elongated handle serves as a lever to increase force on the blade. The blade includes a load bearing plate to which the handle is connected. The load bearing plate terminates in a straight or curved edge. The handle is used to swing or rapidly push the blade into debris whereby any obstruction encountered by the blade is transmitted through the handle to the hands and arms of the user. The handle is usually made of wood and the blade is of metal. Some blades are flat, some are simple curves and some are compound curves for scooping material.

The handle may be a straight or curved shaft with one end connected to the blade in numerous ways, such as rivets, nails, bolts, etc. Other handles may have a "D-shape" terminal end opposite the blade with a cross bar perpendicular to the long shaft of the handle providing greater thrust to the blade.

DESCRIPTION OF THE PRIOR ART

There are many variants of shock absorbing handles designed to lessen the shock and resulting strain on the user. For example, publications, such as WO9952685A1, WO9739858A1, U.S. Pat. Nos. 4,691,954, 5,533,768, 5,727,829, 5,816,634, and 6,792,829 disclose shovels with two-piece telescoping handles having an internal spring and guide to limit travel and prevent rotation. In each of the disclosed devices, the resilient portion of the handle is located close to the blade approximately where the user may grip the shaft to transfer a load. This construction increases the possibility of hand pinching, as well as subjecting the moving components to dirt, debris and the like.

In the '768 patent, the handle shaft, per se, has an integral flexible portion that distorts to lessen shock.

In the '954, '634, and '829 patents, the shovel handle has an upper and a lower portion that telescope together compressing an internal spring to lessen shock.

In the '829 patent, the distal portion of the handle telescopingly cooperates with the shovel blade. A lower portion of the handle includes a washer secured thereto and a biasing member is placed between the washer and the shovel blade.

U.S. Pat. Nos. 483,477 and 6,145,899 disclose shovels with handles terminating in a D-shaped grip. Both devices include a perpendicular cross bar portion having springs mounted on opposite distal ends thereof within parallel side portions of the grip. In each of the disclosed devices, the resilient portion of the grip is located where the user grips the perpendicular cross bar subjecting the user's hands to pinching during operation.

Such prior art devices, while working well, have not met all of the needs of manufacturers to provide a product that can be easily manufactured, packaged and shipped to the consumer. Nor have they met the needs of consumers requiring structural integrity combined with a pleasing aesthetic appearance and ease of use.

Paramount among such needs is a shock absorbing tool construction which resists binding, buckling and weather infiltration.

Also, from a safety standpoint, the biasing member should be located at a position where a user rarely places his hands and a cover should be present which prevents pinching of the operator's hands if placed in proximity of the biasing member.

There are also commercial considerations that must be satisfied by any viable shock absorbing tool assembly; considerations which are not entirely satisfied by state of the art products. The shock absorbing assembly must be formed of relatively few component parts that are inexpensive to manufacture by conventional techniques.

Finally, there are ergonomic needs that a shock absorbing assembly for a hand operated tool must satisfy in order to achieve acceptance by the end user. The shock absorbing assembly and thus the tool must not require or include heavy component parts. Moreover, the components of the shock absorbing tool must connect together in such a way so as not to detract from the utility or versatility of the tool.

BRIEF DESCRIPTION OF THE INVENTION

The present invention provides a lightweight shovel with a large scoop type blade, a plastic coated metal handle and a compact shock absorbing cartridge located between the distal end of the metal handle and a D-shaped handgrip so as to not interfere with the operation of the shovel. The construction of the shock absorbing cartridge simplifies assembly of the shock absorbing shovel while providing a non-pinching and non-binding utility. The leading edge of the blade includes a removable and replaceable shock absorbing wear member to further reduce shock incurred by a user. The blade, D-shaped handle and portions of the shock absorbing cartridge are formed of injection molded plastic having integrated connectors to cooperate with one another in an interlocking manner. Metal fasteners or connectors may be utilized to insure the components remain attached in the harshest conditions.

The device incorporates a minimum number of components by integrally forming the connectors into the injection molded components which slide together for ease of assembly, whereby assembly of the device requires minimal hardware and a minimum number of hand tools. Injection molding allows the components to be formed with a single wall having integral spines, ribs and gussets for increased rigidity. In addition, the polymeric construction prevents corrosion for an aesthetically pleasing tool.

The shock absorbing cartridge includes a one-piece casing for housing the biasing member. One end of the casing includes an integrally formed outwardly projecting boss for interlocking cooperative engagement with an inwardly extending socket formed into the D-shape handgrip. A second end of the casing is constructed with an integrally formed inwardly extending socket for sliding cooperative engagement with the distal end of the elongated handle. The engagement between the bosses and the sockets serve to rigidly connect the components together into a secure shock absorbing shovel. The one piece casing permits the biasing member to be retained completely inside of the shock absorbing cartridge.

Accordingly, it is an objective of the present invention to provide a shock absorbing shovel assembly for moving snow and other particulate matter from one place to another.

A further objective is to provide a shock absorbing shovel assembly having components with integrated connectors which accommodates injection molding plastic formation of the components for increased structural integrity.

Yet a further objective is to provide a scoop type blade having a removable and replaceable shock absorbing wear member along the leading edge thereof.

Another objective is to provide a shock absorbing shovel handle having an enclosed biasing member to prevent pinching.

Yet another objective is to provide a shock absorbing shovel handle having a shock absorbing cartridge inserted between the distal end of the shovel handle and a D-shaped handgrip.

Yet another objective is to provide a shock absorbing shovel handle assembly that includes a removable and replaceable shock absorbing cartridge.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

FIGS. 1-7 which are now referenced illustrate various views of the shock absorbing shovel assembly, generally referenced as 10, according to a preferred embodiment of the present invention. The shock absorbing shovel is made up of a blade 12, an elongated handle 14, a shock absorbing cartridge 16 and a handgrip 18. In the preferred embodiment the components comprising the assembly are formed of, but not limited to, a suitable plastic such as polycarbonate, polystyrene, polypropylene, polyethylene or suitable combination thereof, through the process of injection molding. The result is that the blade, shock absorbing cartridge and handgrip components of the shock absorbing shovel 10 are formed as unitary components with integral connectors. A strengthening spine 20 and gussets 22 are formed integral to the blade member 12 in order to enhance rigidity of the blade while leaving the external surfaces in a generally smooth condition for allowing debris to slide easily across the surfaces during use. In addition to maintaining the curvature of the blade 12, the spine 20 includes an integrally formed socket 26 constructed and arranged to cooperate with a first end 24 of the elongated handle 14 for secure attachment thereof. The socket extends along an inner surface of the spine so that the first end 24 of the handle 14 enters and mateably engages the socket 26, securing the components together in an inter-fitting engagement that prevents rotation therebetween. In addition, the overlapping engagement of the handle and spine serves to add significant rigidity to the blade member.

The integrally formed gussets 22 preferably extend along the two distal ends 28 of the curved blade 12 from about the leading edge 30 to about the rear edge 32. The gussets 22 increase the structural integrity of the curved blade by preventing the blade from bowing, bending and/or twisting, and thus, adversely affecting the appearance or operation of the curved blade 12.

Figure 1:
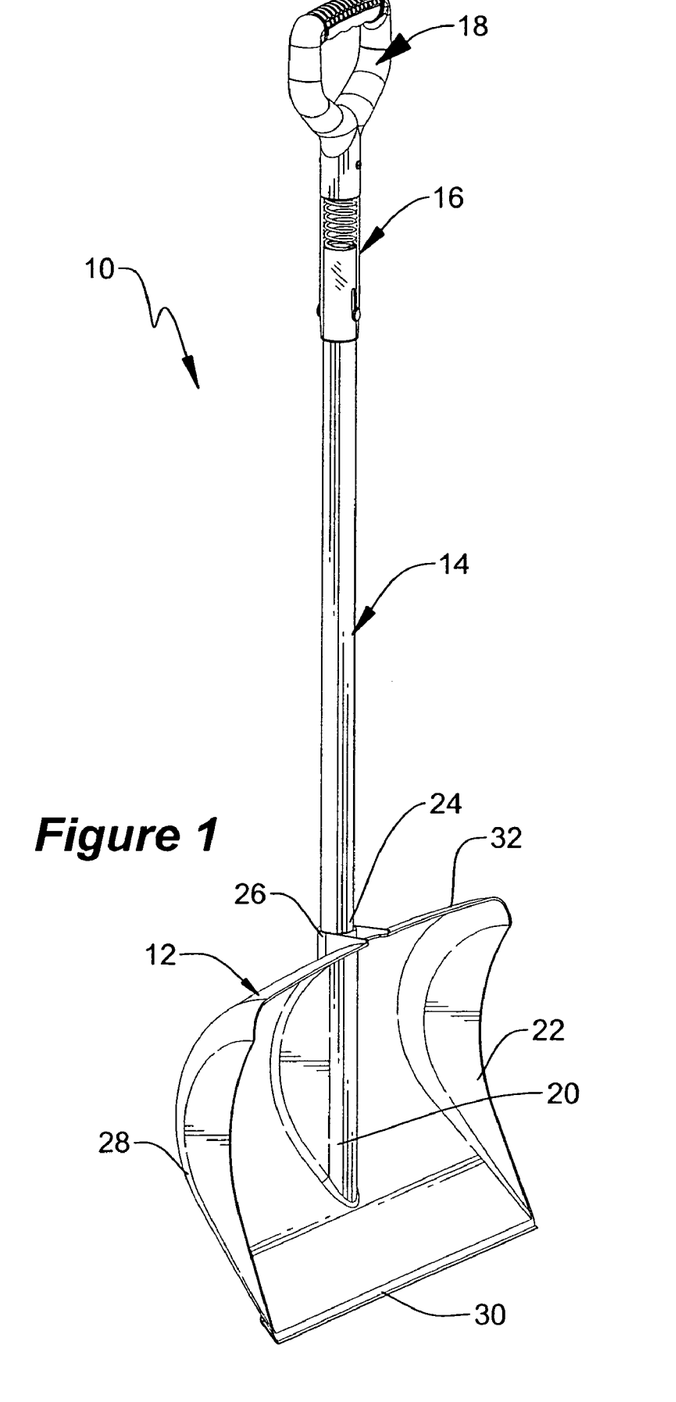
FIG. 1 is a perspective view of the shock absorbing shovel of the instant invention.
Figure 2:
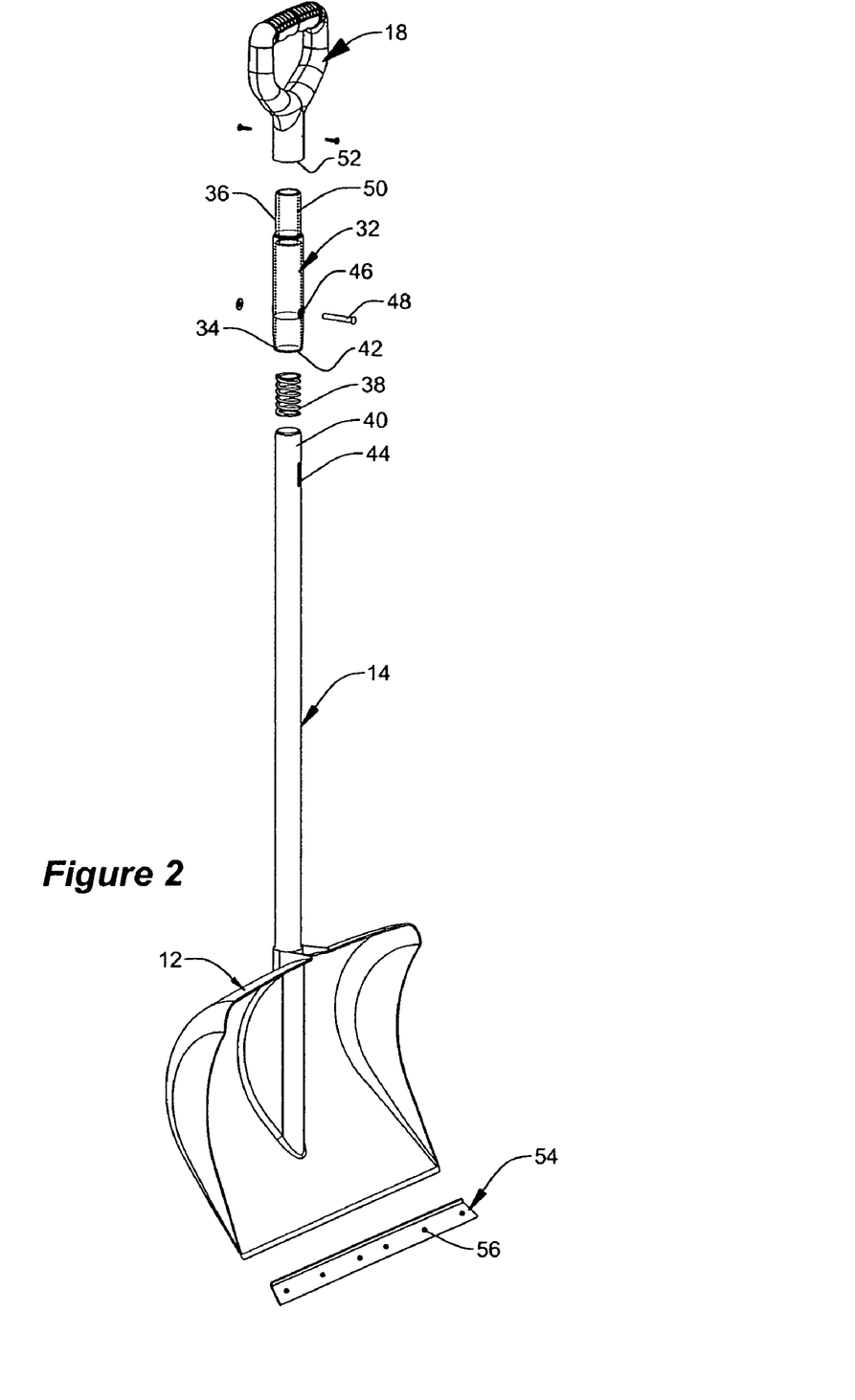
FIG. 2 is an exploded view of the shock absorbing shovel shown in FIG. 1.
Figure 3:
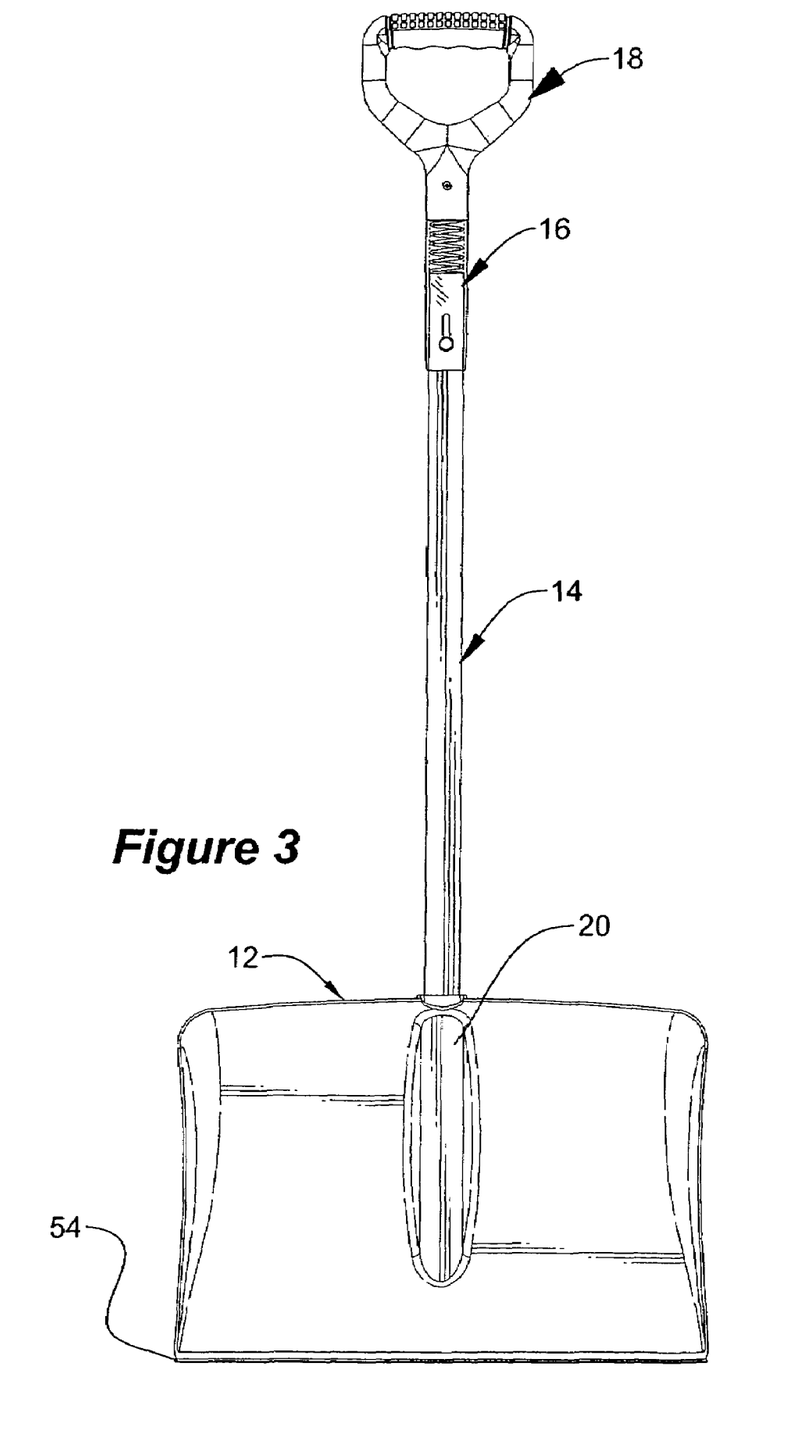
FIG. 3 is a front view of the shock absorbing shovel embodiment shown in FIG. 1.
Figure 4:
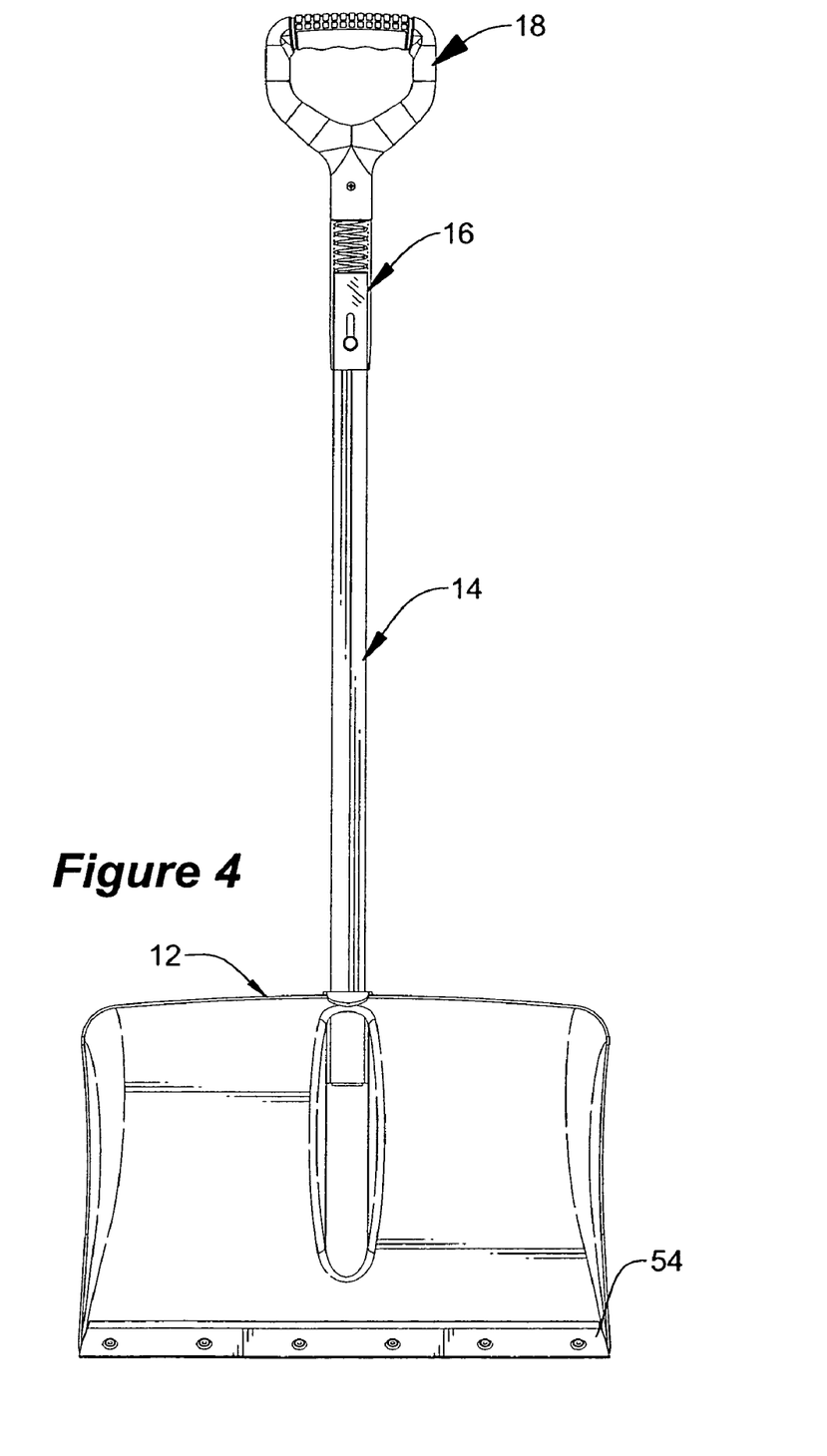
FIG. 4 is a rear view of the shock absorbing shovel embodiment shown in FIG. 1.
Figure 5:
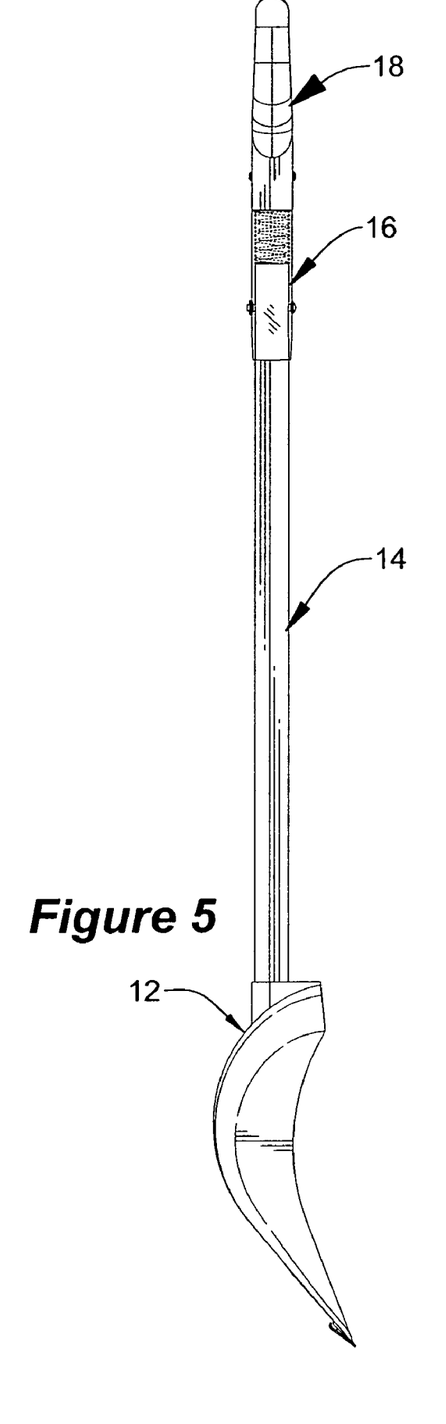
FIG. 5 is a left side view of the shock absorbing shovel embodiment shown in FIG. 1.
Figure 6:
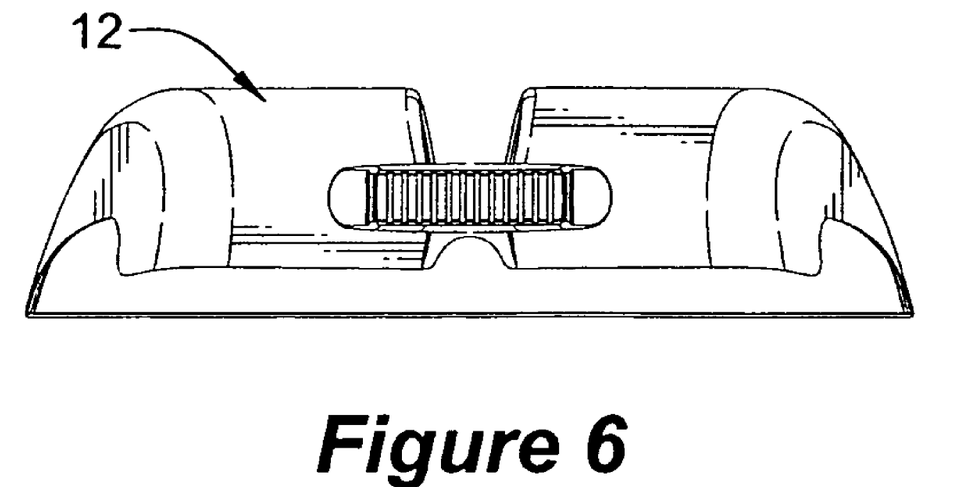
FIG. 6 is a top view of the shock absorbing shovel embodiment shown in FIG. 1.
Figure 7:
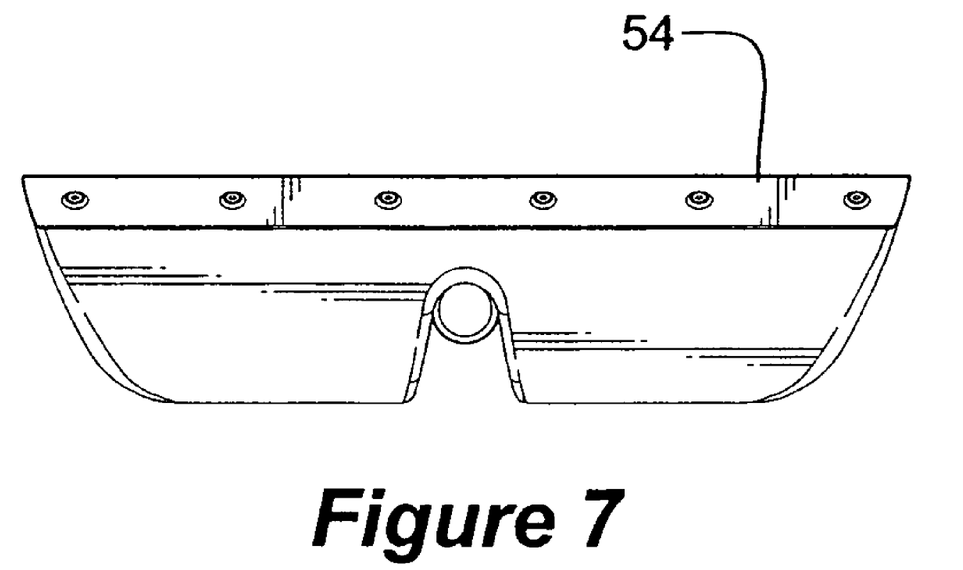
FIG. 7 is a bottom view of the shock absorbing shovel embodiment shown in FIG. 1.
Figure 8:
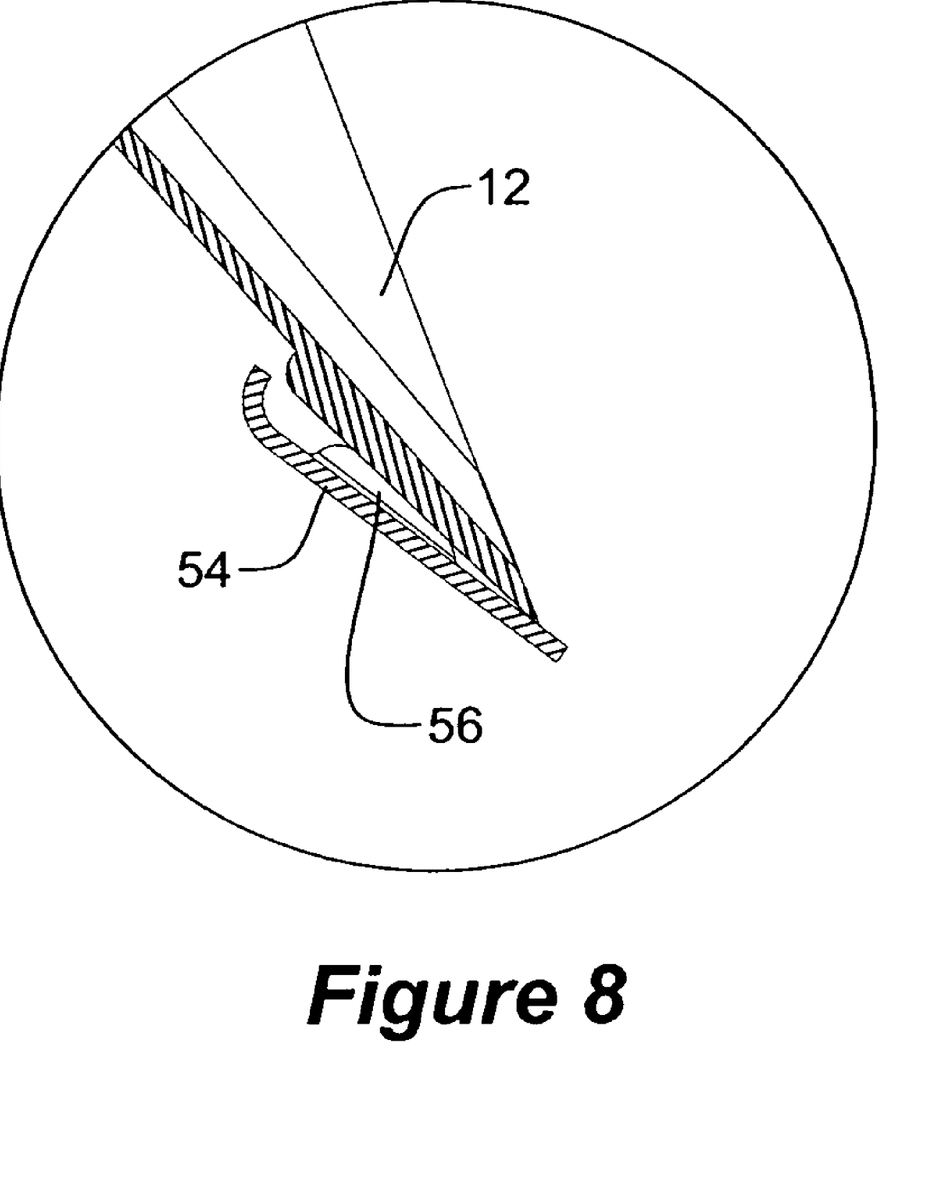
FIG. 8 is a partial cross sectional view of the shovel blade's leading edge.

In a most preferred embodiment, the leading edge 30 includes a shock absorbing wear member 54 extending substantially across the leading edge. The shock absorbing wear member is generally constructed and arranged to flex in a torsional manner during use of the shock absorbing shovel to reduce impact shock. The shock absorbing wear member includes at least one upwardly extending mounting boss 56 constructed and arranged to cooperate with a rear surface of the blade 12 for attachment thereof. The mounting boss(es) 56 are constructed and arranged to flex during use of the shovel for absorbing impact shock. The wear member is secured to the blade in a manner that allows removal and replacement of the wear member as needed.

The shock absorbing cartridge 16 includes an annular shaped substantially rigid outer casing member 32 having a first end 34 and a second end 36. The outer casing member is constructed and arranged to enclose a biasing member 38 as well as providing a connective link between the second end 40 of the elongated handle 14 and the handgrip 18. The first end 34 of the outer casing member 32 includes an integrally formed socket 42 constructed and arranged to cooperate with the second end 40 of the elongated handle 14 in an overlapping, telescoping and non-rotational relationship. To provide a controlled amount of movement between the handgrip 18 and the blade 12, the second end of the handle includes a pair of elongated slots 44 which align with apertures 46 through which pin 48 extends. The second end 36 of the outer casing member 32 includes an integrally formed boss 50. The boss 50 is constructed and arranged to interlockingly engage a corresponding socket 52 formed into a lower portion of the handgrip 18 resulting in a mechanically secure connection therebetween. The biasing member 38 is most preferably a coil spring, however it should be noted that other biasing means well known in the art may include, but should not be limited to, Belleville spring washers, resilient members, nitrogen springs and the like may be utilized without departing from the scope of the invention. The handgrip 18 is formed as a unitary member through the process of injection molding, to generally have a D-shape oriented transverse with respect to a longitudinal axis of the elongated handle. The boss 50 and socket 52 are constructed and arranged so that the boss 50 enters and mateably engages the socket 52, securing the components together in an inter-fitting engagement axially aligned arrangement.

The overlapping cooperation between the bosses and sockets as described above provides a secure connection and offers several advantages. First, the design allows the components to be connected without the need for separate fasteners. Second, the design creates a positive lock that prevents separation of the components. Third, the design maintains alignment of the components along the same axis and prevents bowing or bending of components relative to one another. The resultant shock absorbing shovel created by the combination of the interlocking components benefits from high structural integrity and reliable operation.

As noted above, the shock absorbing shovel assembly including the blade, elongated handle, shock absorbing cartridge and handgrip may be constructed and arranged for snap-together assembly without additional fasteners. Injection molding facilitates the forming of integral spring lock or detent type fasteners which cooperate with apertures and the like, to secure the components together. Those skilled in the art will appreciate that the spring-lock fasteners can be used throughout the shock absorbing shovel 10 to mount or secure components to one another, and to facilitate ready assembly of the shock absorbing shovel if it is provided in an unassembled or broken-down condition. This construction also facilitates easy replacement of worn or broken components.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A shock absorbing shovel assembly comprising;
a blade secured to a first end of an elongated handle;
a shock absorbing cartridge having a first end secured to a second end of said elongated handle, said shock absorbing cartridge having a biasing member therein said shock absorbing cartridge including an annular shaped substantially rigid outer casing member having a first end and a second end, said outer casing member constructed and arranged to enclose said biasing member, said first end of said outer casing member including an integrally formed socket constructed and arranged to cooperate with said second end of said elongated handle in an overlapping, telescoping and non-rotational relationship;
a handgrip connected to a second end of said shock absorbing cartridge;
whereby said biasing member compresses during use of said shovel to reduce impact shock.

2. The shock absorbing shovel assembly of claim 1 wherein said biasing member is a coil spring.

3. The shock absorbing shovel assembly of claim 1 wherein said biasing member is constructed of a polymeric material.

4. The shock absorbing shovel assembly of claim 1 wherein said second end of said outer casing member includes an integrally formed boss, wherein said boss is constructed and arranged to interlockingly engage a corresponding socket formed into said handgrip resulting in a overlapping mechanically secure connection therebetween.

5. The shock absorbing shovel assembly of claim 4 wherein said second end of said outer casing member and said handgrip are constructed and arranged for snap-together assembly without additional fasteners.

6. The shock absorbing shovel assembly of claim 4 wherein said handgrip is substantially D-shaped oriented transverse with respect to a longitudinal axis of said elongated handle.

7. The shock absorbing shovel assembly of claim 4 wherein said handgrip is formed as a unitary member through the process of injection molding.

8. The shock absorbing shovel assembly of claim 1 wherein said blade is a curved blade including a leading edge, a rear edge and two distal ends, wherein said blade includes a centrally located spine integrally formed thereto and extending transverse with respect to said leading edge, said spine constructed and arranged to cooperate with first end of said elongated handle in an interlocking manner.

9. The shock absorbing shovel assembly of claim 8 wherein said distal ends of said blade each include an integrally formed gusset constructed and arranged to maintain the curvature of said blade.

10. The shock absorbing shovel assembly of claim 9 wherein said gussets extend substantially from said leading edge to about said rear edge.

11. The shock absorbing shovel assembly of claim 8 wherein said leading edge includes a shock absorbing wear member, wherein said shock absorbing wear member extends substantially across said leading edge, whereby said shock absorbing wear member flexes during use of said shovel to reduce impact shock.

12. The shock absorbing shovel assembly of claim 11 wherein said shock absorbing wear member is constructed and arranged to torsionally pivot with respect to said blade during use of said shovel.

13. The shock absorbing shovel assembly of claim 11 wherein said shock absorbing wear member includes at least one upwardly extending mounting boss constructed and arranged to cooperate with said blade for attachment thereof, whereby said at least one mounting boss is constructed and arranged to flex during use of said shovel for absorbing impact shock.

14. The shock absorbing shovel assembly of claim 11 wherein said shock absorbing wear member is removable and replaceable.

15. The shock absorbing shovel assembly of claim 11 wherein said shock absorbing wear member is constructed of polymeric material.

16. The shock absorbing shovel assembly of claim 11 wherein said shock absorbing wear member is constructed of polycarbonate plastic.

17. The shock absorbing shovel assembly of claim 1 wherein said blade, said handgrip and said outer casing member are formed through the process of injection molding.

18. The shock absorbing shovel assembly of claim 1 wherein said elongated handle is constructed of metal having an outer layer of polymeric material.

19. A shock absorbing shovel assembly comprising;

a blade secured to a first end of an elongated handle, said blade being a curved blade including a leading edge, a rear edge and two distal ends, wherein said blade includes a centrally located spine integrally formed thereto and extending transverse with respect to said leading edge, said spine constructed and arranged to cooperate with first end of said elongated handle in an interlocking manner, said leading edge including a shock absorbing wear member, wherein said shock absorbing wear member extends substantially across said leading edge, whereby said shock absorbing wear member flexes during use of said shovel to reduce impact shock, said shock absorbing wear member including at least one upwardly extending mounting boss constructed and arranged to cooperate with said blade for attachment thereof, said at least one mounting boss constructed and arranged to flex during use of said shovel for absorbing impact shock;

a shock absorbing cartridge having a first end secured to a second end of said elongated handle, said shock absorbing cartridge having a biasing member therein;

a handgrip connected to a second end of said shock absorbing cartridge;

whereby said biasing member compresses during use of said shovel to reduce impact shock.

* * * * *